United States Patent [19]

Boudart et al.

[11] 4,136,062

[45] Jan. 23, 1979

[54] HIGHLY ACTIVE Pd-Au CATALYST

[75] Inventors: Michel Boudart, Portola Valley, Calif.; Yiu-Lau Lam, Rio de Janeiro, Brazil

[73] Assignee: The Board of Trustees of Leland Stanford Junior University, Stanford, Calif.

[21] Appl. No.: 842,920

[22] Filed: Oct. 17, 1977

[51] Int. Cl.² .................. B01J 23/66; B01J 23/56
[52] U.S. Cl. ..................... 252/460; 252/466 PT
[58] Field of Search ............... 252/460, 466 PT, 472, 252/474

[56] References Cited

U.S. PATENT DOCUMENTS

| | | | |
|---|---|---|---|
| 3,156,735 | 11/1964 | Armstrong | 252/460 |
| 3,441,601 | 4/1969 | Sennewald et al. | 252/460 |
| 3,775,342 | 11/1973 | Kronig et al. | 252/460 |
| 3,957,688 | 5/1976 | Farha, Jr. et al. | 252/460 |

*Primary Examiner*—George Crasanakis

[57] ABSTRACT

A highly active catalyst for oxidative dehydrogenation reactions made up of Pd-Au alloy particles containing about 40 to 80 aromatic percent Au and ranging from 15 to 40 A in size, said particles being supported in an amount of from about 1.5 to 10 weight percent on a silica or other suitable carrier. The alloy particles, which have a surface composition similar to the overall composition, are prepared by an ion-exchange method in which a stable AU III compound such as bisethylenediamine Au III chloride and a palladium salt are added to an aqueous ammoniacal dispersion of the carrier material (i.e. silica gel) to form a precursor which is subsequently reduced in dihydrogen.

6 Claims, No Drawings

HIGHLY ACTIVE PD-AU CATALYST

BACKGROUND OF INVENTION

The Government has rights in this invention pursuant to grant No. ENG74-22234 of the National Science Foundation and IPA No. 0005.

The present application is based on information contained in the following publications:

Y. L. Lam and M. Boudart, Preparation of Small Au-Pd Particles on Silica, Journal of Catalysis 50, 530-540, (1977).

Y. L. Lam, Jose Criado, and M. Boudart, Enhancement by Inactive Gold of the Rate of the $H_2$-$O_2$ Reaction on Active Palladium: A Ligand Effect, Nouveau Journal de Chimie, 1, No. 6, 461-466, (1977).

FIELD OF INVENTION

A novel supported Pd-Au catalyst and method for preparing the same, the catalyst having an activity of from about 25 to 50 times greater than that of Pd alone. The activity is attributable in part to the fact that the Pd-Au alloy particles present have a uniform composition as regards both surface and interior portions and are of an extremely small size, about 15 to 40 A, as well as to the proportion of Au in the Au-Pd alloy and the alloy loading on the catalyst support. The small alloy particle size and uniform alloy composition are attributable to the use of a water-soluble gold compound which is highly stable at elevated temperatures and under strongly alkaline conditions employed in effecting ion-exchange with surface protons of the catalyst support which preferably is silica.

DESCRIPTION OF PRIOR ART

Although catalysis by alloys has been commonplace since the Ostwald process, the preparation and characterization of small alloy particles in the size range between 1 and 5 nm (10-50 A) are recent developments. Thus, while there are various patents and articles dealing with Pd-Au alloy catalysts, none is believed to have disclosed the fine Pd-Au particle catalysts with which the present invention is concerned. Representative U.S. patents of the art containing broad teachings include:

3,637,878 to Hansford, Jan. 25, 1972;
3,789,020 to Carter et al., Jan. 29, 1974;
3,842,017 to Armistead et al., Oct. 15, 1974;
3,901,827 to Sinfelt, Aug. 26, 1975;
3,957,688 to Farha et al., May 18, 1976;
4,021,374 to Petro et al., May 3, 1977;
2,911,357 to Myers et al., Nov. 3, 1959; and
3,775,342 to Kronig et al., Nov. 27, 1973.

Particular mention may be made of U.S. patents 3,894,965 to Foster et al., July 15, 1975, and 3,527,835 to Benesi, Sept. 8, 1970, which teach ion-exchange of noble metals over a silica catalyst provided with $NH_4^+$ ions, this process according in general with the similar step as practiced in the present invention. However, no mention is made in the Foster et al. and Benesi patents of the preparation of gold-containing alloy particles. Any gold-containing compounds to be employed in this ion-exchange process involving $NH_4^+$ ions must be water soluble and extremely stable under heated, ammoniacal conditions. No such compounds were known to the present inventors.

The present invention rests in part in the discovery that gold-containing complexes formed by the reaction of an Au III compound with some bidentate coordinating groups have the requisite solubility and stability under the desired ammoniacal ion-exchange conditions and thus enable the production of the desired Pd-Au alloy particles. These Au III complexes are those of the type taught in an article by B. P. Block and John C. Bailar, Jr., J.A.C.S., 73, 4722 (1951), the disclosures of which are specifically incorporated herein by reference.

It will be noted that of particular interest in the case of Pd-Au alloys is the so-called synergistic effect according to which rates of a number of reactions for certain Pd-Au alloy compositions are reported to be higher than those for pure components. The rate maxima reported for these alloys are not particularly high, with rate values at the maxima not exceeding 12 times the value for pure palladium which, in turn, has an activity of about 35 times that of pure gold under certain conditions. See, for example, A. Couper and D. D. Eley, *Discussion Faraday Soc.*, 8, 172 (1950);

D. W. McKee, *J. Phys. Chem.*, 70, 525 (1966) and also, *J. Catal.*, 14, 355 (1969);

W. A. Hardy and J. W. Linnett, *Trans. Faraday Soc.*, 66, 477 (1970);

S. H. Inami and H. Wise, *J. Catal.*, 26, 92 (1972);

C. Visser, J. C. P. Zuidwijk and V. Ponec, *J. Catal.*, 35, 407 (1974); and

M. Nakamura and H. Wise, preprint No. B., 28, *Proc. VIth Internat. Congress on Catalysis*, London, (1976).

In contrast to the (at most) twelvefold increase in activity of a Pd-Au alloy catalyst over that of Pd alone, as brought out in the foregoing literature references, that of the alloys of the present invention may be from about 25 to 50 times higher than that for pure Pd, as measured by a study of the reaction between gaseous $H_2$ and $O_2$ in excess $O_2$.

SUMMARY OF THE INVENTION

This invention relates to a highly active catalyst comprising Pd-Au alloy particles containing from about 30 to 80 (and preferably about 40 to 80 atomic percent of Au and ranging from about 15 to 40 A in size, said alloy particles being supported in an amount of from about 1.5 to 10 weight percent on an inert, porous, adsorptive and refractory oxide material which preferably is silica or silica gel, though other inert supports such as alumina or silica-alumina, for example, may be used. This catalyst is characterized by an activity which, with a preferred alloy composition containing from about 40 to 80 atomic percent of Au, ranges from about 25 to 50 times higher than for similarly supported catalysts containing only Pd and no Au component. At an Au content of but 30 atomic percent, the activity of the catalyst falls somewhat below this level. The catalyst is further characterized by a uniform composition from one alloy particle to another and throughout each such particle.

The catalysts of the present invention have utility in connection with a number of reactions including those of oxidative dehydrogenation. Illustrative of such reactions are those involving oxidations of alcohols to aldehydes and ketones and the oxidation of ethylene to acetic acid and to vinyl acetate. The catalyst can also be used to catalyze the hydrogenation of unsaturated hydrocarbons and carbonyl compounds. Another reaction effectively catalyzed by the present catalysts is the reaction of $H_2$ and $O_2$ to form water. As described below, this latter reaction was used to determine relative catalyst activity between samples of varying catalyst loading (on silica) and of varying Pd-Au composition.

This invention also relates to a method for preparing the novel Pd-Au alloy catalyst. Said method comprises adding a dilute aqueous solution of stable Pd- and Au-containing compounds, present in amounts calculated to give the desired alloy composition, to a warm dispersion of silica or other appropriate support in an aqueous ammoniacal medium whereby Au- and Pd-containing ions are exchanged for $NH_4^+$ ions present in the support material. This is followed by washing and other conventional steps including that of reduction in dihydrogen at elevated temperatures to form the desired alloy particles of the present invention.

Novelty lies in selecting and employing for this purpose an Au III-containing compound which is highly stable under the ion-exchange conditions. That is to say, the Au compound should be one which is able to withstand temperatures of 60°–80° C. and continued contact with ammoniacal solutions having a pH of 11 or more. The Pd-containing compound employed should also be one which is stable under these conditions. However, those palladium compounds commonly employed in catalyst formation normally have the requisite stability for use in the present invention. Thus, compounds such as $Pd(NO_3)_2$, $PdCl_2$, and $[Pd(NH_3)_4]Cl_2$ can be used. Such is not the case with the Au III-containing compounds which have heretofore been proposed for use in forming Au-containing alloys, e.g., $AuCl_3$ and tetrachloroauric acid. The present invention rests in part in the discovery that certain Au III compounds, as described below, do have the requisite stability and can remain unchanged in the ion-exchange solution until, molecule by molecule, the desired ion-exchange reaction takes place at the ammonia-bearing surfaces of the silica or other equivalent support material employed. As a result of this stability the Au-containing and Pd-containing ions are layed down on the surface of the support, with complete uniformity and in conformity with the molecular proportions of Pd and Au compounds which are present, as an incident of the ion-exchange process. This uniformity of composition carries over to both the surface as well as the interior portions of the Pd-Au alloy particles which are thereafter deposited in extremely small particle form during the step of reduction at elevated temperature (e.g., 300° C.) in the presence of dihydrogen.

The Class of Au III compounds which has been discovered to have the requisite stability characteristics is that formed by the reaction of Au III with some bidentate coordinating groups, as taught in the aforementioned J.A.C.S. article by Block and Bailar.

Said article contemplates the reaction of an Au compound such as $HAuCl_4$ or $KAuBR_4$ with 1,2-ethanediamine (ethylenediamine, en), 1,2-propanediamine (propylenediamine, pn), 2,2'-bipyridine (a,a'-dipyridyl, dipy), or 1,10-phenanthroline (phen) to form complexes. A typical preparation is that in which $[Au(en)_2]Cl_3$, the complex which is employed in the example provided below, is described by the authors as follows:

"A gummy yellow precipitate was formed by the addition of a solution of 1 ml. of 1,2-ethanediamine monohydrate in 5 ml. of diethyl ether to a solution of 1.0 g. of $HAuCl_4$ in 10 ml. of ether. A while precipitate resulted when 20 ml. of ethyl alcohol was added to the orange solution of the preceding product in 2.8 ml. of water. This precipitate, which weighed 0.95 g., was dissolved in 2.3 ml. of water and reprecipitated with 15 ml. of ethyl alcohol to give 0.90 g. of a white solid."

The above product may otherwise be referred to as bis-ethylenediamine Au III chloride.

Other stable complexes recited by Block and Bailar include the following, all of which are believed to have utility in the process of the present invention:

[Au(en)(en-H)]$Br_2$,
[Au(en)$_2$]$Br_3$,
[AuCl$_2$(dipy)][AuCl$_4$],
[AuBr$_2$(dipy)][AuBr$_4$],
[AuCl$_2$(phen)]Cl,
[AuCl$_2$(phen)]NO$_3$,
[AuBr$_2$(phen)]Br and
[AuCl$_2$(phen)][AuCl$_4$].

The authors noted that the reaction product of 1,2-propanediamine and $HAuCl_4$ or $KAuBr_4$ was too soluble to be isolated. However, isolation is not required for use of the dissolved complex in a practice of the present invention.

The following example is illustrative of the manner in which the Pd-Au alloy catalysts of the present invention are prepared:

EXAMPLE

Concisely, the sample preparation consisted of three consecutive steps. First, the salt [Au(en)$_2$]Cl$_3$ was prepared by the method of Block and Bailar, as quoted above. Second, a weighed amount of silica (Silica Gel Grade 950 from Davison Chemical Division of W. R. Grace & Co., specific surface area 700 $m^2$ $g^{-1}$, specific pore volume 0.4 $cm^3$ $g^{-1}$) was warmed to about 70° in aqueous ammonia of pH about 11. The amount of solution was adjusted to 20 $cm^3$ per gram of silica. The appropriate amount of [Au(en)$_2$]Cl$_3$ was dissolved in a calculated amount of 0.01 M solution of [Pd(NH$_3$)$_4$]Cl$_2$, to give the desired alloy composition. The concentration of [Au(en)$_2$]Cl$_3$ was never allowed to exceed 0.01 M. The well mixed solution of complex salts was added dropwise into the slurry of silica at a rate of approximately 6 $cm^3$ per minute with constant stirring. At this rate, the temperature of the slurry never fell below 62°. After the addition of the solution, the slurry was maintained at about this temperature for one hour and then cooled to room temperature. The treated silica, herein designated as the precursor, was filtered and thoroughly washed with at least three portions (each of 5–6 $cm^3$ per g. of silica) of doubly distilled water.

Finally, the precursor was loaded into a Pyrex glass cell and evacuated by a diffusion pump at 60° overnight. After the cell was cooled down to room temperature, dihydrogen was passed over the precursor at a space velocity of about 5 $s^{-1}$. The precursor was slowly heated to 150° and then maintained at that temperature for 1 hour. Then the temperature is increased to 300° and is kept at that level for three more hours before cooling down to room temperature in flowing dihydrogen. After evacuation at room temperature for 0.5 hour, the sample was slowly exposed to air and then stored.

There may be a number of variations of the heating procedures. Heating the sample up to 500° for 3 hours resulted in gold particles of similar average particle diameter as determined by x-ray line broadening. However, from the intensities of the diffraction peak, it is observed that patterns of samples after a 300° reduction are much lower in intensity compared to those after a 500° reduction, indicating that a larger fraction of Au particles is in the x-ray amorphous size range in the case of the lower reduction temperature. Oxidizing a reduced sample (reduced previously at 300°) at 500° overnight has an effect similar to that of re-reduction at 500°.

Catalyst samples formed by the procedures of the example are enumerated in Table 1 below along with convenient code inditia denoting the percent gold that was aimed at in the preparation, as well as that which was actually obtained. The atomic percent of Au is indicated in parenthesis. Letters L (low) and H (high) stand for metal loading in the vicinity of 125 and 250 $\mu$mol g$^{-1}$ sample, respectively. The letter E (excess) stands for a metal loading exceeding 380 $\mu$mol g$^{-1}$. Except for sample L(80), the results of the elemental analysis shown in the table are in good agreement with the nominal Au %. A possible explanation for the deviation between the nominal and the determined composition for L(80) is as follows. Instead of using freshly prepard Au amine salt, the amine salt used had been prepared 10 days before exchange. It was dissolved in water and filtered to remove possible photodecomposed Au salt. Filtration loss or photodecomposition or the Au complex to Au metal might have occurred. Hence the Au complex solution was diluted. Such a deviation from nominal composition was circumvented in later preparations by using freshly prepared complexes for exchange (one or two days old).

Table 1

Composition of Samples on Silica Support

| Designation (nominal composition) | Atomic % Au in Pd-Au Alloy | Total Metal Content | |
|---|---|---|---|
| | | $\mu$mol g$^{-1}$ | wt. % on SiO$_2$ |
| L(0 | 0 | 131 | 1.4 |
| L(20) | 19.4 | 125 | 1.6 |
| L(40) | 40.2 | 114 | 1.6 |
| L(60) | 54.2 | 122 | 1.9 |
| L(80) | 66.7 | 133 | 2.2 |
| L(100) | 100 | 122 | 2.4 |
| H(0) | 0 | 227 | 2.4 |
| H(20) | 20.8 | 249 | 3.1 |
| H(40) | 42.1 | 272 | 3.9 |
| H(60) | 59.0 | 225 | 3.6 |
| H(80) | 79.7 | 236 | 4.0 |
| H(90) | 88.0 | 196 | 3.7 |
| H(100) | 100 | 216 | 4.25 |
| E(20) | 23.0 | 736 | 9.3 |
| E(52) | 53.0 | 460 | 7.1 |
| E(100) | 100 | 380 | 7.5 |

Tests were conducted on the Pd-Au alloy samples using Mossbauer effect spectroscopy (MES), x-ray diffraction and chemisorption of H$_2$, O$_2$ and CO to characterize the small alloy particles of the catalyst. The Mossbauer effect of $^{197}$Au yielded direct evidence of alloy formation and suggested that the alloy particles were of a uniform composition close to the composition of the whole alloy sample. Further, selective chemisorption and x-ray line broadening indicated that the surface composition of the alloy particles was similar to the overall composition.

In order to evaluate the relative activity levels of the catalysts of the present invention, tests were conducted using the reaction between H$_2$ and O$_2$ to determine the turnover frequency of each catalyst. For the Pd-Au alloys the turnover frequency is defined as the number (N$_{Pd}$) of H$_2$ molecules reacting per surface Pd atom per second under given conditions of temperature ($-10°$) and hydrogen partial pressure (1.0 kPa). In brief, a stoichiometric gaseous mixture of H$_2$ and O$_2$ generated by an electrolytic cell was fed continuously into a recirculation loop. The loop included a reactor where the catalyst was evenly supported on a fritted glass disc, a molecular sieve trap which removed water generated by the reaction, and a bellows pump which circulated the gas mixture in the loop. When the system reaches a stationary state, the rate of H$_2$ introduction is equal to the rate of the reaction on the catalyst surface. Hence, the total pressure in the loop is constant. The rate of reaction can then be calculated from the cell current at the stationary state.

In a typical run, a current of 0.04 to 2.0 A was employed and the rise in total pressure never exceeded 4.5 kPa. At a given temperature, the pressure of H$_2$ at steady state was varied by varying the rate of introduction of the H$_2$-O$_2$ mixture. Every sample was first tested at $-10°$ and then at higher temperatures (0°-17°). Then, the temperature was lowered to $-10°$ to check if any irreversible change had occurred on the surface during reaction at the higher temperatures. The more active catalysts were also studied at temperatures lower than $-10°$. The turnover frequency (N$_{Pd}$) is a function of pressure, and from pure Pd to Pd-Au alloys with less than or equal to 60 atomic % Au, the order, n, with respect to H$_2$ was unity. However, for alloys richer than 60 atomic % Au, first order with respect to H$_2$ was no longer observed. For such Au-rich alloys the order, n, is in the vicinity of 0.5.

Table 2 presents values of N$_{Pd}$ of the samples studied at 10° and 1° and at P$_{H_2}$ of 1.0 kPa. Note again that there is good agreement between values of N$_{Pd}$ for samples with low loading and the high loading sample with approximately the same composition and dispersion of Pd. Pd dispersion values are also given in Table 2, said dispersion (D$_{Pd}$) being defined as the ratio Pd$_s$/Pd of numbers of surface and total Pd atoms. The number of surface Pd atoms, Pd$_s$, was measured by dissociative adsorption of O$_2$ and the assumption that the O/Pd ratio is unity. The comparison of N$_{Pd}$ for a sample with more than 50 atomic % Au with that of a sample with less than 60 atomic % Au depends on the choice of P$_{H_2}$, as noted above.

Table 2

Comparison of Turnover Numbers N$_{Pd}$ of Samples With Different Metal Loadings and Varying Au Contents, at $-10°$ and 1.0 kPa Partial Pressure of H$_2$

| Sample | N$_{Pd}$s$^{-1}$ | Pd Dispersion |
|---|---|---|
| H(0) | 0.12 | 0.49 |
| L(0) | 0.08 | 0.64 |
| H(20) | 0.10 | — |
| L(20) | 0.07 | 0.74 |
| H(40) | 2.6 | 0.43 |
| L(40) | 2.3 | 0.35 |
| H(60) | 4.5 | 0.30 |
| L(60) | 4.1 | 0.28 |
| H(80) | 3.8 | — |
| L(80) | 1.5 | |
| L(90) | 0.30 | |

When the turnover numbers of Table 2 are plotted on a curve, it appears that catalysts which could be designated as H(30) or L(30) would have N$_{Pd}$/s$^{-1}$ values of from about 0.8 to 1.0.

What is claimed is:

1. A catalyst useful in hydrogenation and oxidative dehydrogenation reactions comprising Pd-Au alloy particles containing from about 30 to 80 atomic percent Au and ranging in size from about 15 to 40A, said alloy particles being supported in an amount of from about 1.5 to 10 weight percent on an inert, porous adsorptive, refractory oxide support.

2. The catalyst of claim 1 wherein the supporting material is silica or silica gel.

3. The catalyst of claim 2 wherein the alloy particles contain from about 40 to 80 weight percent Au.

4. A method for preparing a catalyst made up of fine Pd-Au alloy particles of uniform composition held on an inert, porous, adsorptive, refractory oxide support, said method comprising adding a dilute aqueous solution of stable Pd- and Au III-containing compounds, present in proportions calculated to give the desired Pd-Au alloy composition, to a warm dispersion of said support in an aqueous ammoniacal medium whereby Au III- and Pd-containing ions are exchanged for $NH_4^+$ ions present in the support; washing the resulting support to free the same of other than Au III- and Pd-containing ions; and heating the washed support in dihydrogen at temperatures effective to reduce the metals and form fine Pd-Au alloy particles on the support surfaces; said stable Pd- and Au III-containing compounds each being characterized by the ability to withstand temperatures of 60°–80° C. when in continuous contact with ammoniacal solutions having a pH of at least 11.

5. The method of claim 4 wherein the Au-containing compound employed to form the dilute aqueous solution is one wherein Au III is complexed with one of 1,2-ethanediamine, 1,2-propanediamine, 2,2'-bipyridine and 1,10-phenanthroline.

6. The method of claim 5 wherein the Au-containing complex employed is bis-ethylenediamine Au III chloride.

* * * * *